United States Patent
Ritter et al.

[15] 3,699,756
[45] Oct. 24, 1972

[54] MACHINE FOR MANUFACTURING STEEL STRUCTURAL PARTS

[72] Inventors: Klaus Ritter; Hans Gott; Josef Ritter; Gerhard Ritter, all of Graz, Austria

[73] Assignee: EVG Entwicklungs-und Verwertungsgesellschaft mbH, Graz, Austria

[22] Filed: Nov. 29, 1971

[21] Appl. No.: 202,935

[30] Foreign Application Priority Data

Nov. 27, 1970    Austria ................ A 10732/70

[52] U.S. Cl. .................... 219/56, 219/78, 219/87, 219/103, 219/107
[51] Int. Cl. ............................................ B23k 11/02
[58] Field of Search....219/103, 56, 57, 58, 106, 107, 219/104, 78, 79, 80, 86, 87, 83

[56] References Cited

UNITED STATES PATENTS

| 3,056,883 | 10/1962 | Eisenburger et al. ..... 219/56 X |
| 3,612,816 | 10/1971 | Hand ....................... 219/87 X |
| 1,271,428 | 7/1918 | Burns ......................... 219/78 |

Primary Examiner—J. V. Truhe
Assistant Examiner—B. A. Reynolds
Attorney—Ernest F. Marmorek

[57] ABSTRACT

Disclosed is an electric welding machine including an endless chain of welding heads, each head supporting opposite electrode holders for longitudinal rods and grippers for transverse rods, and cam means operable for controlling the operative and inoperative positions of the holders and grippers.

5 Claims, 7 Drawing Figures

MACHINE FOR MANUFACTURING STEEL STRUCTURAL PARTS

The invention relates to the manufacture of steel structural parts, consisting of two parallel longitudinal rods connected together by welded transverse rods. Special structural parts of this kind are the subject of our U.S. Pat. No. 728,866 and are on the market under the trade name "Bi-Steel" for use as reinforcement for concrete.

The method usually employed for manufacturing steel structural parts of this kind is as follows. The two longitudinal rods are fed into the welding machine convergently so that their distance apart at the welding location is a little greater than the distance apart desired in the finished product. A cut off length of transverse rod is fed into position between the longitudinal rods, at the welding location, clearances remaining between the ends of the transverse rod and the two longitudinal rods, whereupon the two longitudinal rods are thrust towards each other by external electrodes, which thrust them firmly into contact with the ends of the transverse rod, applying the necessary welding pressure. Finally the longitudinal rods are welded to the transverse rod, preferably by sequential spot welding, after which the structure is advanced one step, ready for the next welding operation. It will be observed that the longitudinal rods are advanced intermittently, the welding taking place during the intervals when they are stationary.

In order to increase the output of a machine for manufacturing structural parts of this kind, the present applicant has previously proposed to arrange the machine in such a way that the longitudinal and transverse rods are advanced continuously. The welding is done by the sequential spot welding method. Two electrodes circulating on closed paths thrust inwards from either side against the outer surfaces of the longitudinal rods, thrusting them firmly against the ends of the transverse rod, so as to retain the transverse rod in position and apply the necessary welding pressure. The external electrodes, the longitudinal rods and the transverse rod all travel along together during the welding operation.

The fact that the electrodes travel along with the continuously advancing rods has two advantages. In the first place this ensures that the welding current is applied long enough to ensure that a good weld is made. Secondly the method ensures that the welding current heats the rods only in the immediate neighborhood of the welding location. This is important in the manufacture of Bi-Steel, because the longitudinal rods are cold drawn steel rods with comparatively high concentrations of alloying elements, particularly carbon. The welding heat must therefore be applied as nearly as possible only at the welding location, to prevent modification of the metallurgical properties of these steels.

In accordance with the invention, in a machine for manufacturing steel structural parts consisting of two parallel longitudinal rods connected together by welded transverse rods, the machine comprises means for feeding the two longitudinal rods convergently, means for introducing the transverse thrust rods between the longitudinal rods and electric resistance welding heads for welding the transverse rods to the longitudinal rods; several welding heads are linked together to form an endless chain which is driven continuously so that the chain follows a closed path in the plane of symmetry between the two longitudinal rods, the path of the chain having a straight welding stretch extending parallel to the plane of the two longitudinal rods, each welding head having a gripper for receiving and holding in position a transverse rod and two welding electrodes one on each side of the gripper, the two welding electrodes being arranged to move towards and away from each other, thrust devices being provided for moving the welding heads towards each other and for applying the necessary welding pressure, a feeding device being provided, on the chain path, for feeding transverse rods to the grippers, and there being means for conducting electric current to the welding electrodes.

The present invention thus provides an improved machine which is arranged in such a way that during the welding process each transverse rod is retained reliably and precisely in the correct position relative to the longitudinal rods. The new machine further ensures that the welding thrust applied by each electrode, which partly determines the quality of the weld, is applied precisely perpendicular to the axis of the longitudinal rod at the welding location and in line with the axis of the transverse rod, so that the welding pressure is distributed symmetrically over the cross section of the transverse rod. This is to ensure that when the steel rod structure is installed in concrete and tension is applied to the longitudinal rods, so that a bending stress acts on the transverse rod, which anchors the rod structure in the concrete, the strength of the weld is independent of the direction of the tensile stress applied to the longitudinal rods.

A machine constructed in accordance with the invention is illustrated in the accompanying drawings, in which.

Figure 1:
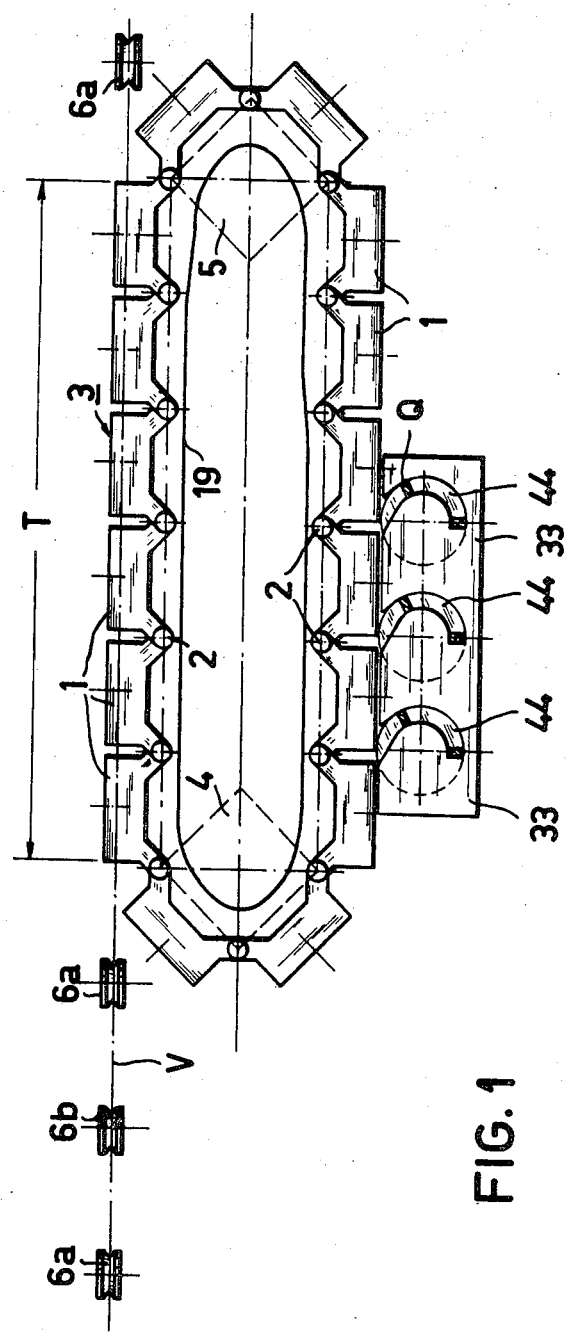
FIG. 1 is a diagrammatical side view showing the circulating welding head chain of a device according to the invention and showing also the feeding devices for feeding the longitudinal and transverse rods.
Figure 2:
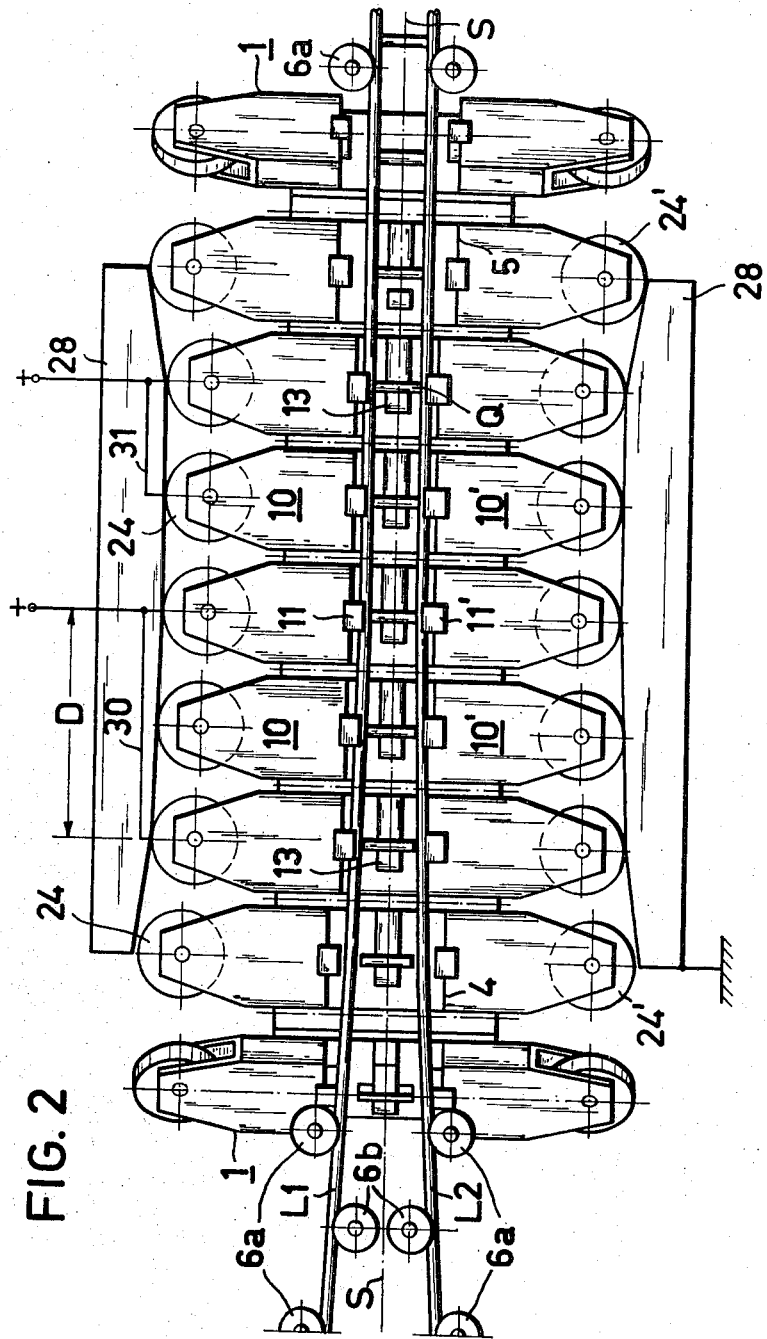
FIG. 2 is a plan view corresponding to FIG. 1 but drawn to a somewhat larger scale, showing the arrangements for actuating the welding electrodes and indicating also arrangements for feeding electric welding current.

As shown in FIGS. 1 and 2, a number, for example 16, of welding heads 1 are linked together by pivot pins to form a chain 3 of welding heads, somewhat similar to a bicycle chain. The chain of welding heads circulates endlessly over two terminal sprocket wheels 4 and 5, at least one of which is continuously power driven, so that the welding heads circulate continuously. The sprocket wheels 4 and 5 are merely indicated in the drawing. Each sprocket wheel is in the form of one or more circular or square discs, with notched edges for accommodating the pivot pins 2, or bushes or the like mounted on the pivot pins.

The upper strand of the chain follows a straight path, that is to say the welding heads 1 move along in a straight path, as represented in FIG. 1, the welding heads moving along at the height of the plane V containing the longitudinal wires L1, L2, which are being fed convergently, guided by rollers 6a, 6b. In FIG. 2 the vertical plane of symmetry between the two longitudinal wires L1 and L2 is indicated at S. This is also the middle line of the path followed by the welding heads.

Figure 3:
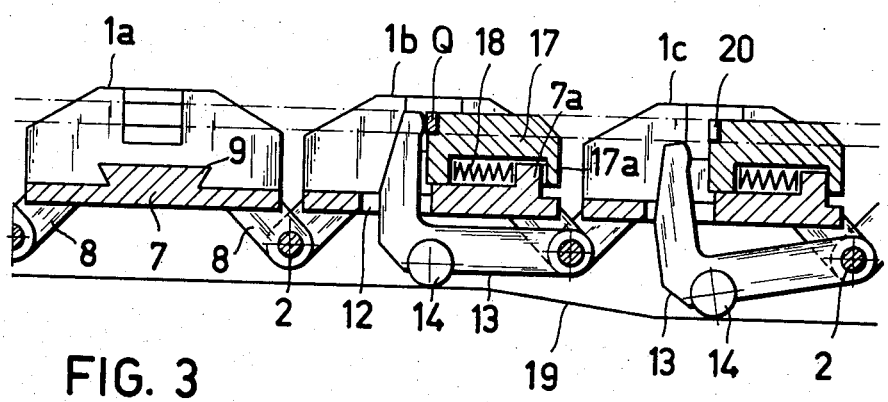
FIG. 3 is a partly sectioned side view of the welding head chain, showing one welding head sectioned non-centrally and two welding heads which are shown sectioned centrally.

As shown in the non-central section 1a in FIG. 3, each welding head has a base part 7 from which project arms 8, joined by pivot pins 2 to the arms of the neighboring welding heads in the chain. The upper surface of the base part 7 is arranged as a guide, for example the dovetail guide 9 shown in FIG. 3, along which two electrode holders 10 and 10' (compare FIG. 2) can slide towards and away from each other. Each electrode holder 10, 10' supports an electrode 11, 11'.

In the middle of each base part 7 there is an opening 12, as shown in the centrally sectioned welding heads 1b and 1c in FIG. 3. One arm of an angled lever in the form of a pivoted jaw 13 projects upwards through the opening 12. The pivoted jaw 13 is pivoted on the forward pivot pin 2 of the welding head. Mounted on the pivoted jaw 13 at its elbow there is a cam follower roller 14, which follows a cam surface 19. The pivoted jaw 13 cooperates with a spring loaded sliding jaw 17, which is loaded by a spring 18 which tends to hold the sliding jaw 17 in the position shown at 1c in FIG. 3. In this position the movement of the sliding jaw 17 is limited by stops 7a and 17a.

The cam surface 19 is the surface of a cam rail extending all along the path followed by the welding head chain. The cam follower roller 14 of each welding head 1 follows the cam rail 19. The curve of the cam rail 19 is arranged so that at a certain location along the cam rail the pivoted jaw 13 closes against the spring loaded sliding jaw 17, gripping a transverse rod Q, which has previously been fed into a positioning notch 20. The transverse rod Q is shown gripped in position at 1b in FIG. 3. The transverse rod Q remains gripped, that is to say it is retained in the positioning notch 20 by the two gripping jaws during the period required for welding the ends of the transverse rod to the two longitudinal rods L1 and L2. The feeding of the transverse rod Q into the positioning notch 20 will be described further below. The transverse rod can be fed into the positioning notch 20 at any suitable location on the path of movement of the welding head chain. The transverse rod is however preferably fed to the lower strand of the circulation welding head chain, that is to say the transverse rod is fed into the positioning notch 20 when the welding head is upside down, the transverse rod being fed into the positioning notch 20 from underneath. The positioning notch 20 ensures that the transverse rod Q is held precisely in position while it is being welded to the longitudinal rods L1 and L2.

At their outer ends the two electrode holders 10, 10' of each welding head 1 have forks in which rotate thrust rollers 24, 24', as shown in FIG. 2. When the rollers 24, 24' are not in contact with cam rails 28 and 28' the two electrode holders 10, 10', with their electrodes 11, 11' are thrust apart, against mechanical stops, by springs which are not shown in the drawing, so that the two electrodes 11 and 11' are as far apart as they can go.

When the electrode head 1 is travelling along the path of the upper strand of the welding head chain the two electrode holders 10, 10' are thrust inwards, towards each other, by the two cam rails 28, 28', so that the two electrodes 11, 11' are thrust inwards against the outer surfaces of the two longitudinal rods L1, L2, the cam rails 28, 28' thrusting against the rollers 24, 24'. The thrust of the electrodes against the longitudinal rods is sustained all through the welding period to ensure that good welds are made. It should be observed that the welding thrusts are applied entirely symmetrically due to the straight line movements of the electrode holders, the arrangement providing the best possible welding conditions.

The welding current can be fed to the electrodes in various ways, and can be switched on and off by various methods. In FIG. 2 it has been assumed, as an example, that at least one of the two electrode holders 10, 10' is electrically insulated against the base part 7 of the welding head 1, the welding current being fed to the welding electrode 11 over the thrust roller 24, which acts as a contact roller. In this case the cam rail 28 can be constructed of an electrically insulating material, the cam rail 28 being however equipped with a conductor bar 30 to which the welding current is fed from a welding transformer, as indicated by the plus sign in FIG. 2. The other cam rail 28' can be made of an electrically conductive material and can be connected to the other, earthed pole of the welding transformer. The welding current circuit is closed during the period taken by the welding head to travel over the distance D shown in FIG. 2. At a location further downstream along the path of movement there can be a further contact bar 31 on the cam rail 28, this contact bar 31 being at a different voltage relative to the cam rail 28'. The arrangement allows the welding to be followed by a heat treatment to improve the metallurgical quality of the welded metal. The electric contacts can if desired be arranged so that welding current is supplied to only one welding head at a time, or to several welding heads connected in parallel or fed with different phases from a polyphase supply, moreover the duration of the current supply can if desired by controlled in the known way by external switches.

Figure 4:
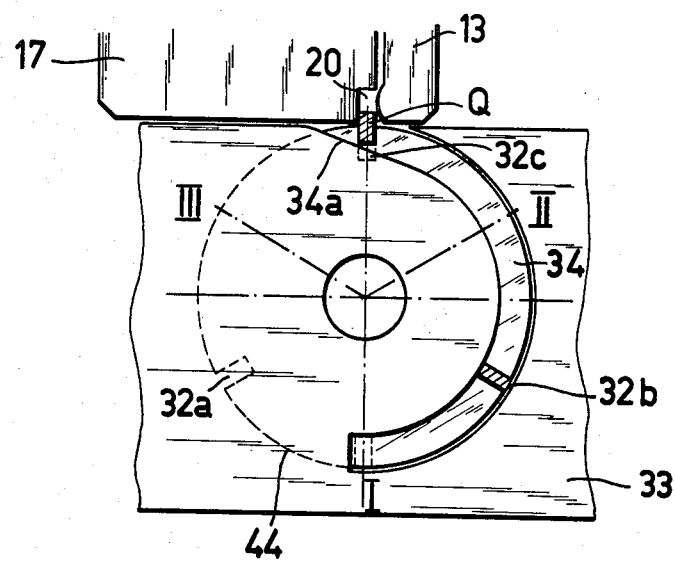
FIG. 4 is a diagrammatic side view of a feeding device for feeding transverse rods.
Figure 5:
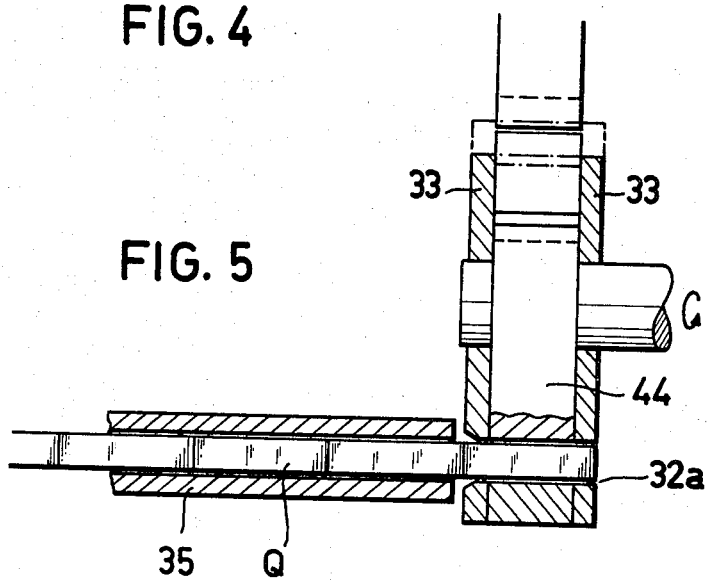
FIG. 5 is a corresponding cross section.

FIGS. 4 and 5 show an example of a feeding device for feeding transverse rods to the welding heads 1 moving along the lower strand of the welding head chain. Of the welding head itself FIG. 4 shows only the lower end of the pivoted jaw 13 and of the spring loaded sliding jaw 17, showing these two jaws closed for holding the transverse rod Q. An intermittently rotating wheel 44 has three receiver notches 32a, 32b, 32c, spaced equally apart at 120°, for receiving the transverse rods Q. In FIG. 4 the notched wheel 44 is represented in a position which it occupies during one of its intermittent rotations. When the notched wheel 44 is in its position of rest, one of the notches, for example the notch 32a, is in the position I. When the notch is in this position a cut off length of transverse rod Q is fed into the notch from the side by the feeder tube 35 shown in FIG. 5. The cut off length of transverse rod Q is fed into the positioning notch 20 of the welding head as follows. The notched wheel 44 rotates through 240°, bringing the notch 32a into the position III. During this rotation the transverse rod is fed into the positioning notch 20 of the welding head, which is constantly travelling past the feeding device. In FIG. 4 a cut off length of transverse rod Q is shown in a notch 32c of the notched wheel 44, the transverse rod being shown during the process of transfer into the positioning notch 20 of the welding head. The feeding device has slotted cheek plates 33, one on each side of the notched wheel 44. Each cheek plate has an essentially semi-circular guiding channel 34 with a sloping edge 34a for delivering the transverse rod into the positioning notch 20 of the welding head. The sloping edges 34a bear against the ends of the transverse rod. Assuming that the notched wheel 44 is initially in its position of rest, the transverse rod in the notch 32a being at the position I, the notched wheel 44 begins rotating, accelerating until the transverse rod, its ends guided by the semi-circular slot, is fed into the positioning notch 20 of the welding head, the periphery of the notched wheel 44 travelling at this instant at the same linear speed as the welding head. The transverse rod is fed into the positioning notch 20 by the sloping slot edges 34a, which bear against the ends of the transverse rod. Finally the notched wheel 44 deccelerates, bringing the notch 32a to rest in the position III, the notch 32b being now in the loading position I, whereupon the cycle is repeated.

FIG. 1 shows three feeding devices of the kind shown in FIGS. 4 and 5, the three feeding devices being positioned one after the other so that three welding heads can be fed simultaneously with transverse rods Q. Subsequently the three welding heads, after reaching the upper strand T of the welding head chain, can be energized with the three phases of a 3-phase current supply. This arrangement increases the output of the machine.

Figure 6:
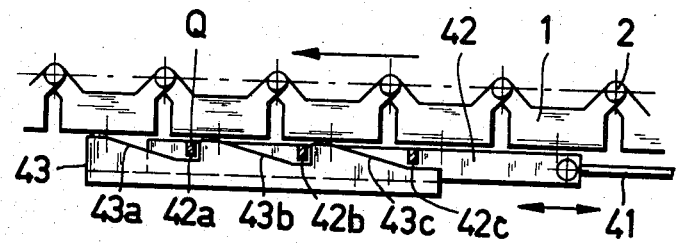
FIGS. 6 and 7 represent diagrammatically a different feeding arrangement.
Figure 7:
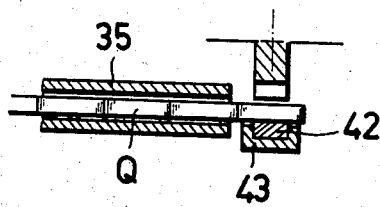

FIGS. 6 and 7 correspond to FIGS. 4 and 5 but show a feeding device of different construction, in which instead of an intermittently rotating feeder wheel there is a reciprocating feeder device. A reciprocating rod 41 drives a reciprocating comb 42 which has three receiver notches 42a, 42b, 42c for receiving the transverse rods and delivering them to the welding heads. Cut off lengths of transverse rod Q can be fed from the side through a loading tube 35 into the receiver notches of the comb 42. The comb 42 slides back and forth in a guide 43 of U-shaped cross section which has sloping edges 43a, 43b, 43c which bear against the ends of the transverse rods Q. For feeding the transverse rods into the positioning notches of the welding heads, the comb 42 is accelerated by the rod 41 up to the linear velocity of the welding heads 1, as indicated by the arrow. The ends of the transverse rods run up over the sloping surfaces 43a, 43b, 43c, which thrust them upwards between the jaws of three passing welding heads.

The examples of the invention represented can be modified in a number of ways. The travelling movements of the electrodes, their inwards movements and the movements of the gripping jaws which hold the transverse rods precisely in position can be produced by other distance dependent mechanical devices, other than cam rails cooperating with thrust rollers. The feeding devices, for feeding the transverse rods, can be constructed differently and they can be installed at other locations. If desired the grippers for gripping the transverse rollers can be equipped with permanent magnets or electromagnets.

We claim:

1. A machine for manufacturing steel structural parts consisting of two parallel longitudinal rods connected together by welded transverse rods, the machine comprising means for feeding the two longitudinal rods convergently, means for introducing the transverse thrust rods between the longitudinal rods and electric resistance welding heads for welding the transverse rods to the longitudinal rods, wherein several welding heads are linked together to form an endless chain which is driven continuously so that the chain follows a closed path in the plane of symmetry between the two longitudinal rods, the path of the chain having a straight welding stretch extending parallel to the plane of the two longitudinal rods, each welding head having a gripper for receiving and holding in position a transverse rod and two welding electrodes one on each side of the gripper, the two welding electrodes being arranged to move towards and away from each other, thrust devices being provided for moving the welding heads towards each other and for applying the necessary welding pressures, a feeding device being provided, on the chain path, for feeding transverse rods to the grippers, and there being means for conducting electric current to the welding electrodes.

2. A machine according to claim 1, in which each welding head has a base part equipped with parallel guides extending perpendicular to the length of the welding head chain, the guides guiding two electrode holders, electric conductors being provided on either side of the welding stretch, for example in the form of cam rails which act on thrust rollers mounted on the electrode holders for advancing the welding electrodes into contact with the longitudinal rods, and for applying the welding thrusts.

3. A machine according to claim 2, in which each welding head is equipped, between its two electrode holders, with a gripper having jaws operable for gripping a transverse rod, one of said jaws being provided with a cam follower and additional cam rails extending along the path of the welding head chain in contact with said cam follower controlling the closing and opening of the jaws of the gripper.

4. A machine according to any one of claims 1 to 3, in which two or more intermittent transverse wire loaders are provided, together capable of simultaneously loading transverse wires to the same number of welding heads, the loaded welding heads subsequently all receiving welding current simultaneously.

5. A machine according to claim 4, in which there are three wire loaders and the three loaded welding heads each receive one phase from a 3-phase current source.

* * * * *